United States Patent
Amano et al.

(10) Patent No.: US 6,235,433 B1
(45) Date of Patent: May 22, 2001

(54) HIGH MOLECULAR GEL ELECTROLYTE AND SECONDARY BATTERY USING THE SAME

(75) Inventors: Kosuke Amano; Yutaka Bannai; Hiroshi Yageta; Masaharu Satoh; Etsuo Hasegawa, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/217,078

(22) Filed: Dec. 21, 1998

(30) Foreign Application Priority Data

Dec. 19, 1997 (JP) .................................................. 9-350409
Dec. 19, 1997 (JP) .................................................. 9-350410
Dec. 24, 1997 (JP) .................................................. 9-354480

(51) Int. Cl.[7] .................................................. H01M 10/40
(52) U.S. Cl. ........................ 429/303; 429/300; 429/199; 429/200; 252/62.2
(58) Field of Search .................................. 429/300–303, 429/199, 200, 190, 192, 254; 252/62.2

(56) References Cited

U.S. PATENT DOCUMENTS

| | | | | |
|---|---|---|---|---|
| 5,415,958 | * | 5/1995 | Takahashi | 429/217 |
| 5,429,891 | * | 7/1995 | Gozdz | 429/192 |
| 5,456,000 | * | 10/1995 | Gozdz | 29/623.2 |
| 5,460,904 | * | 10/1995 | Gozdz | 429/192 |
| 5,514,461 | * | 5/1996 | Meguro | 428/310.5 |
| 5,739,234 | * | 4/1998 | Kashi | 526/255 |
| 5,849,433 | * | 12/1998 | Venugopal | 429/190 |
| 5,858,264 | * | 1/1999 | Ichino | 252/62.2 |
| 5,962,168 | * | 10/1999 | Denton, III | 429/303 |
| 6,051,343 | * | 4/2000 | Suzuki | 429/316 |
| 6,096,453 | * | 8/2000 | Grunwald | 429/212 |

FOREIGN PATENT DOCUMENTS

| | | |
|---|---|---|
| 9-235479 | 9/1997 | (JP) . |
| 10-199328 | 7/1998 | (JP) . |
| 11-66948 | 3/1999 | (JP) . |
| 11-86627 | 3/1999 | (JP) . |
| 11-172096 | 6/1999 | (JP) . |

OTHER PUBLICATIONS

Japanese Unexamined Patent Publication No. H9–289038, published Nov. 4, 1997.
Japanese Unexamined Patent Publication No. H10–112215 (corresponding to H8–67104), published Apr. 28, 1998.
Japanese Unexamined Patent Publication No. H10–144137 (corresponding to H8–295559, published May 29, 1998.
Japanese Unexmained Patent Publication No. H10–199328 (corresponding to H8–6631) published Jul. 31, 1998. (previously submitted with IDS of Oct. 20, 1999).
Japanese Unexamined Patent Publication No. H11–185524, published Jul. 9, 1999.
Japanese Unexamined Patent Publication No. H9–235479, published Sep. 9, 1997. (previously submitted with IDS of Jan. 7, 2000).
Japanese Unexamined Patent Publication No. H10–116516, published May 6, 1998.
Japanese Unexamined Patent Publication No. H10–36688, published Feb. 10, 1998.
Japanese Unexamined Patent Publication No. H1–167309, published Jul. 3, 1989.

* cited by examiner

Primary Examiner—Carol Chaney
Assistant Examiner—Mark Ruthkosky
(74) Attorney, Agent, or Firm—Sughrue, Mion, Zinn, Macpeak & Seas, PLLC

(57) ABSTRACT

A secondary battery has a positive electrode, an electrolyte, and a negative electrode. The electrolyte is made up of a high molecular gel electrolyte comprising a matrix polymer and an electrolyte solution included in the matrix polymer. The electrolyte solution is formed by dissolving an ionic compound in a nonaqueous organic solvent. The matrix polymer forms a high molecular network by dispersing (i) a compound containing at least two polymerizable functional groups, (ii) compound having a polymerizable functional group and containing one of a carbonyl group, an amido group, and an oxyalkylene group, and (iii) a vinylidene fluoride polymer and polymerizing them.

23 Claims, 4 Drawing Sheets

HIGH MOLECULAR GEL ELECTROLYTE AND SECONDARY BATTERY USING THE SAME

FIELD OF THE INVENTION

The present invention relates to a high molecular gel electrolyte of a solid state having a high ionic conductivity and being excellent in the electrolyte solution retentive property and the mechanical strength and to a secondary battery, in particular, to a lithium secondary battery having a small size and a large capacity, giving a high output density, and having a high safety by using the above-described high molecular gel electrolyte.

BACKGROUND OF THE INVENTION

Recently, a multimedia technology has been rapidly developed with the advent of the information-oriented era. The high performance and the portability of electronic products have been strongly demanded. Such demand inevitably requires an energy source, such as a secondary battery. Under the circumstances, a new secondary battery is actively investigated and developed as the energy source for aiming at small-sizing and increasing the capacity and the energy density. So-called lithium ion secondary batteries were commercialized early in the 1990's. Such a lithium ion secondary battery includes a metal oxide and a carbon metal having a property of capable of occluding a lithium ion as the positive electrode and negative electrode, respectively. In such a secondary battery, the positive and the negative electrodes are opposite to each other with a separator and an electrolyte interposed between them. The lithium ion second battery is one of secondary batteries having a high energy density. Since a lithium ion secondary battery uses an electrolytic solution, the battery has however a possibility of causing liquid leakage to occur and leaves a problem on the safety. Also, to prevent the liquid leakage, a metallic can or case must be used as the external container. Therefore, the battery has a difficulty in making it small in size and thin in thickness.

On the other hand, Armand et al (U.S. Pat. No. 4,303,748) already proposed a chargeable electrochemical power generator which applied with a high molecular solid electrolyte made up of a solid solution of a polyalkylene oxide and an alkali metal or an alkaline earth metal in place of using an electrolytic solution.

However, a high molecular solid electrolyte has not only an insufficient ionic electric conductivity but also a very high contact resistance with a positive electrode and a negative electrode. Moreover, the high molecular solid very high contact resistance with a positive electrode and a negative electrode. Moreover, the high molecular solid electrolyte is made up of polyethylene oxide, polypropylene oxide, etc. which are ordinary polyalkylene oxides. Such a high molecular solid electrolyte has not yet been practically employed (see, K. Murata, Electrochimica Acta., Vol. 40, No. 13–14, pages 2177–2184, 1995).

Also, to solve the above-described problems, various efforts have hitherto been made. For example, Mizoguchi et al. proposed an ion conductive solid-form composition made up of an organic high molecular compound having a dielectric constant of at least 4 (for example, polyvinylidene fluoride, polyacrylonitrile, etc.) and an organic solvent having an excellent solubility to the organic high molecular compound (see, Japanese Patent Publication Nos. 61-23945 and 61-23947). This kind of the ionic conductor is called a high molecular gel electrolyte. The ionic conductor is kept in a solid state. Therefore, the ionic conductor is sometimes called simply a high molecular solid electrolyte to avoid confusion with a conventional high molecular solid electrolyte.

It is considered that the excellent mechanical strength is maintained in the high molecular gel electrolyte by a high molecular compound which becomes a matrix and the high ionic conductivity is attained by a solution portion included in the high molecular compound as a molecular level. In this case, the material design of the high molecular material tends to be focused on a matrix. The proposal of Mizoguchi et al. has been widely accepted at present and various improvements have been made (see, Gozdz et al., Polymer-made electrolytic cell separator film and the production method thereof, U.S. Pat. No. 5,418,091).

However, various problems have yet been left on the mechanical characteristics and the heat resistance. This requires a further improvement.

To this end, Gozdz et al. (U.S. Pat. No. 5,429,891) propose a crosslinked hybrid electrolytic film and the production method thereof. In the electrolytic film, a copolymer of vinylidene fluoride and hexafluoropropylene is used as the matrix polymer. Furthermore, radiations, such as electron rays, etc., are used for the formation of the crosslinked structure. The proposal is advantageous in that by controlling the content of hexafluoropropylene in that by controlling the content of hexafluoropropylene in the copolymer, a high ionic electric conductivity and a mechanical strength are attained with a good balance and that by forming a crosslinked structure with a crosslinking agent, the mechanical strength and the heat resistance are improved.

In a secondary battery, the use of a high molecular gel electrolyte not only greatly improves the ionic electric conductivity of the electrolyte but also largely reduces the contact resistance of the electrolyte with electrodes. Thereby a polymer battery has been partially practically used which utilizes the high molecular gel electrolyte. However, various large problems have yet remained.

For example, Gozdz et al also disclose a high molecular gel electrolyte made up of the copolymer of vinyldene fluoride and hexafluoropropylene and a nonaqueous electrolyte solution dissolving a lithium salt. The high molecular gel electrolyte enables improvement about one figure higher ionic electric conductivity as compared with the ionic conductive solid-form composition proposed by Mizoguchi et al. and is excellent in the mechanical strength at room temperature. However in U.S. Pat. No. 5,418,091, the high molecular gel electrolyte is insufficient in the heat resistance and is not always sufficient in the electrolytic solution retentive property at a high temperature. Also, in the high molecular gel electrolyte disclosed in U.S. Pat. No. 5,429,891, it is considered that both the mechanical characteristics an the heat resistance are improved but the electrolytic solution retentive property is yet insufficient. However, it is considered that because radiations, such as electron rays, are used. It is necessary to remove hydrofluoric acid formed due to the radiations, which makes the production method complicated. Thus, the high molecular gel electrolyte cannot always be suitable for practical use. Furthermore, to further improve the high rate discharging characteristics and the low-temperature characteristics of a polymer battery, the ionic electric conductivity has been desired for being further improved.

SUMMARY OF THE INVENTION

The present invention has been made for solving the above-described problems.

It is a first object of the present invention to provide a high molecular gel electrolyte which attains the higher ionic electric conductivity and the excellent mechanical characteristics with a good balance, and which is excellent in the electrolytic solution retentive property at a high temperature and is also easily produced.

It is a second object of the present invention to provide a secondary battery using the above-described high molecular gel electrolyte.

As the result of making various investigations for achieving the above-described first object, the present inventors have discovered that by using a polymer comprising a vinylidene polymer wherein a high molecular network made up of a compound having a crosslinked structure-forming function and a solvent retentive function is uniformly formed as the matrix of a high molecular gel electrolyte, not only both the higher ionic electric conductivity an the excellent mechanical strength are attained with a good balance but also the high molecular gel electrolyte is excellent in the electrolyte solution retentive property, and that the high molecular gel electrode can be easily produced and practically used. Also, it has been found that by applying the technique, the above-described problems can be effectively solved, and the present invention has been attained.

According to the present invention, there is provides a high molecular gel electrolyte comprising a matrix polymer and an electrolyte solution of an ionic compound dissolved in a nonaqueous organic solvent included in the polymer matrix. In the high molecular gel electrolyte, the matrix polymer forms a high molecular network by dispersing (i) a compound containing at least 2 polymerizable functional groups in the same molecule and (ii) one of first through third compounds having a polymerizable functional group and containing a carbonyl group, an amido group, and an oxyalkylene group, respectively, in a vinylidene fluoride polymer and polymerizing them.

The high molecular gel electrolyte of the present invention is excellent in the mechanical characteristics because the vinylidene polymer is surrounded by the high molecular network. Also, because the high molecular network contains a carbonyl group, the electric conductivity of the high molecular gel electrolyte using a carbonate-based organic solvent can be increased.

Accordingly, in the high molecular gel electrolyte of the present invention, the excellent mechanical strength of the practical level and the high ionic electric conductivity of the practical level of at least 1.0 MS/cm are realized as well as the electrolyte solution retentive property at a high temperature can be ensured, and hence, hereinafter, the real application as the electrolyte of a secondary battery has been largely expected.

Furthermore, because the secondary battery using the high molecular gel electrolyte of the present invention has a high ionic electric conductivity of the electrolyte, the secondary battery of a high output of almost the same level as a conventional secondary battery using an electrolytic solution.

Moreover, because there is no trouble of liquid leakage in the secondary battery of the present invention, the safety is high and super-thinning is possible.

DETAILED DESCRIPTION OF THE INVENTION

Figure 1:
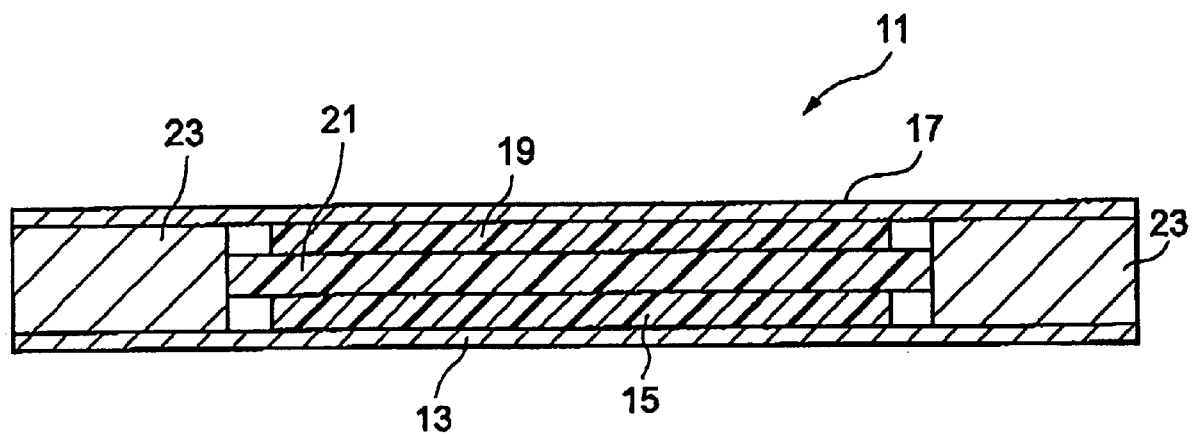
FIG. 1 is a cross sectional view of a thin-type polymer lithium secondary battery of Example 2 according to the present invention.

Before describing the preferred examples of the present invention, the content of the present invention is schematically described.

In the present invention, after uniformly dispersing the above described compounds (i) and (ii) in a vinylidene fluoride polymer, by carrying out the polymerization by, for example, heat, light, or a radiation, such as an electron ray, etc., a high molecular network can be formed in the vinylidene fluoride polymer. In this case, to form a uniform high molecular network by facilitating the polymerization under a mild condition, it is preferable that the polymerizable functional group has an unsaturated ethylene bond and, particularly, may have an acryloyl group or a methacryloyl group.

The present invention is not restricted to the vinylidene fluoride polymer but may be a copolymer, for example, a copolymer of polyvinylidene fluoride, a copolymer of vinylidene fluoride and hexafluoropropylene, a copolymer of vinylidene fluoride and tetrafluoroethylene, a copolymer of vinylidene fluoride, hexafluoropropylene, and tetrafluoroethylene, etc.

Also, the compound (i) is not particularly restricted which has at least two polymerizable functional groups in the same molecule but specific examples of a diacrylate compound as one of the compound (i) includes 1,4-butandiol diacrylate, 1,6-hexanediol diacrylate, triethylene glycol diacrylate, tetraethylene glycol diacrylate, etc., and the acrylate compound having three or more functional groups includes trimethylolpropane triacrylate, pentaerythritol tetraacrylate, etc. These acrylate compounds can be used singly or as a combination of the plural compounds.

Also, in the compounds (ii), the first compound has a polymerizable functional group and contains a carbonyl group. The first compound is represented by following formula (1):

(1)

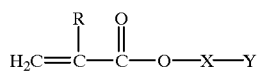

where R represents a hydrogen atom or a methyl group; X may not always be included but represents an alkylene group or an oxyalkylene group; and Y represents a substituent having at least one carbonate bond.

As specific examples of the above-described first compound having a carbonyl group, the following compounds may be given, wherein, for example, —X—Y is the substituent represented by each of the following formulae (5) to (7):

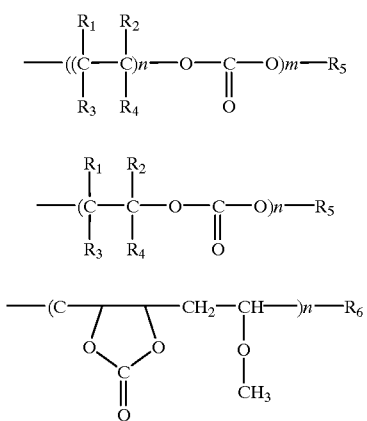

(5)

(6)

(7)

In the formulae (5) to (7), n and m each represents a positive integer and there are no particular restriction on $R_1$ to $R_6$. For example, $R_1$ to $R_4$ and $R_6$ each independently represent a hydrogen atom; an alkyl group such as methyl, ethyl, propyl, butyl, etc.; an alkoxy group, such as hydroxymethyl, hydroxyethyl, hydroxypropyl, hydroxybutyl, etc.; a halogen atom such as fluorine, chlorine, bromine, iodine, etc.; or a polar group, such as nitro, cyano, etc.; but they are not limited to these groups. $R_5$ represents an alkyl group such as methyl, ethyl, propyl, butyl, etc.; an alkoxy group such as hydroxymethyl, hydroxyethyl, hydroxypropyl, hydroxybutyl, etc.; a halogen atom such as fluorine, chlorine, bromine, iodine, etc.; a polar group such as nitro, cyano, etc., but $R_5$ is not limited to these groups.

Also, as specific examples of the first compound of the compounds (ii), the following compounds may be given, wherein X does not exist and Y is the substituent shown by each of following formulae (8) to (12)

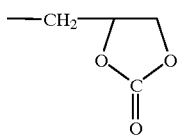

(8)

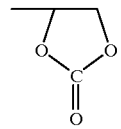

(9)

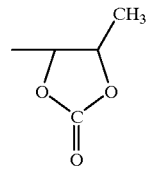

(10)

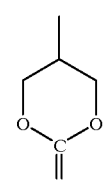

(11)

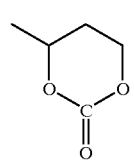

(12)

Also, in the compounds (ii), the second compound has a polymerizable functional group and contains an amido group. Examples of the second compound are represented by following formulae (2) and (3) respectively;

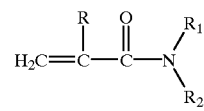

(2)

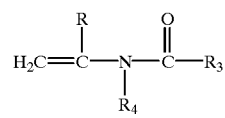

(3)

where R represents a hydrogen atom or a methyl group and $R_1$ to $R_4$ each independently represent an aliphatic substituent or an aliphatic substituent containing a hetero atom.

More in detail, $R_1$ to $R_4$ each independently represent, for example, an alkyl group, such as methyl, ethyl, propyl, butyl, etc., or an alkoxy group, such as hydroxymethyl, hydroxyethyl, hydroxypropyl, hydroxybutyl, etc. The above-described alkyl group or alkoxy group may contain a halogen atom, such as fluorine, chlorine, bromine, iodine, etc.; a polar group such as nitro, cyano, etc.; an alkylene oxide group; a carbonyl group; a carbonate group; an amido group, etc. However, $R_1$ to $R_4$ are not limited to these group.

As specific examples of the above-described compound having an amido group, compounds may be given as shown by following formulae (13) to (21):

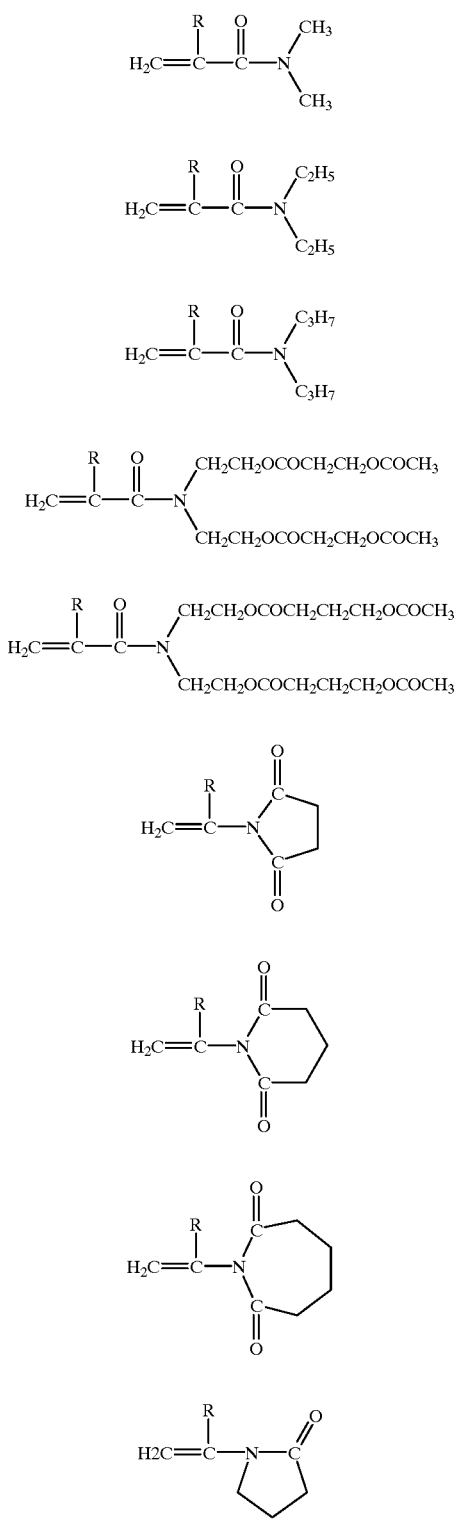

Also, in the compounds (ii), the third compounds has a polymerizable functional group and contains an oxyallene group. The third compound is, for example, one of compounds represented by following formula (4);

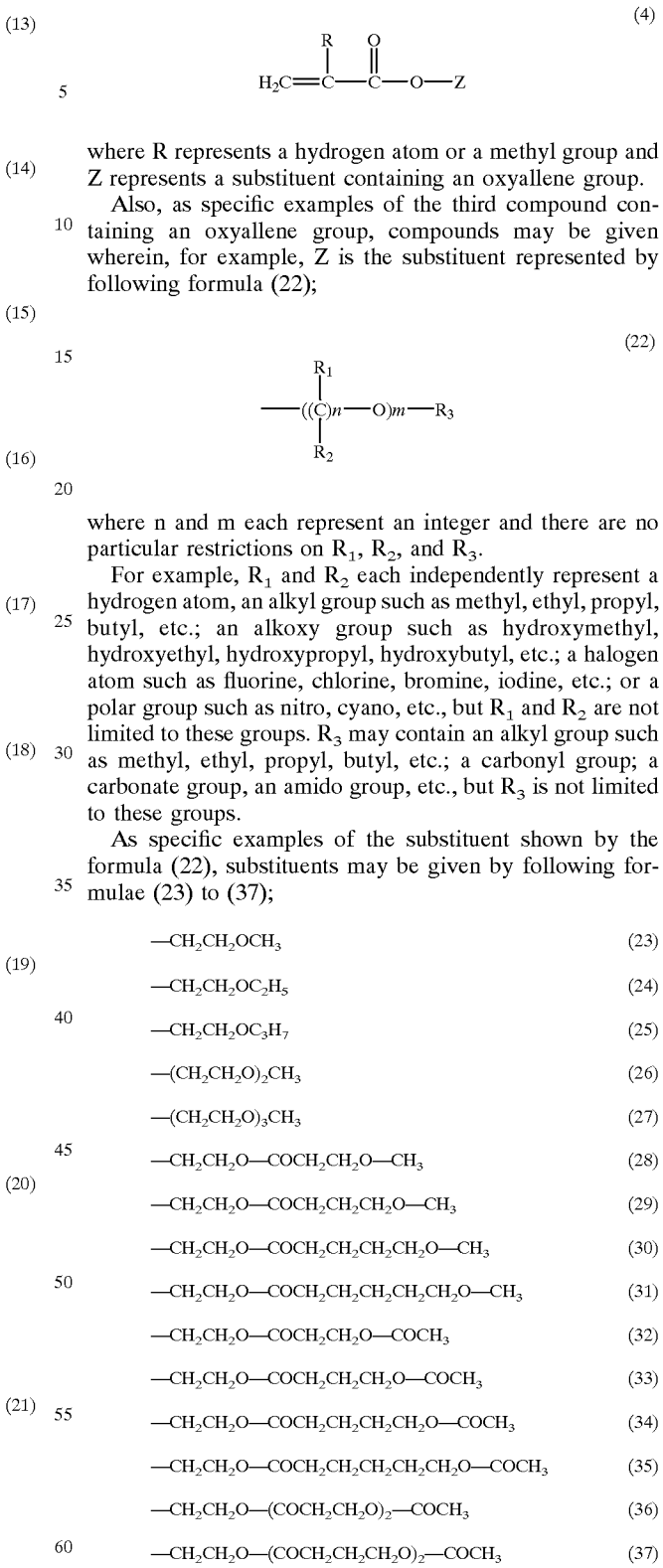

where R represents a hydrogen atom or a methyl group and Z represents a substituent containing an oxyallene group.

Also, as specific examples of the third compound containing an oxyallene group, compounds may be given wherein, for example, Z is the substituent represented by following formula (22);

where n and m each represent an integer and there are no particular restrictions on $R_1$, $R_2$, and $R_3$.

For example, $R_1$ and $R_2$ each independently represent a hydrogen atom, an alkyl group such as methyl, ethyl, propyl, butyl, etc.; an alkoxy group such as hydroxymethyl, hydroxyethyl, hydroxypropyl, hydroxybutyl, etc.; a halogen atom such as fluorine, chlorine, bromine, iodine, etc.; or a polar group such as nitro, cyano, etc., but $R_1$ and $R_2$ are not limited to these groups. $R_3$ may contain an alkyl group such as methyl, ethyl, propyl, butyl, etc.; a carbonyl group; a carbonate group, an amido group, etc., but $R_3$ is not limited to these groups.

As specific examples of the substituent shown by the formula (22), substituents may be given by following formulae (23) to (37);

| | |
|---|---|
| —$CH_2CH_2OCH_3$ | (23) |
| —$CH_2CH_2OC_2H_5$ | (24) |
| —$CH_2CH_2OC_3H_7$ | (25) |
| —$(CH_2CH_2O)_2CH_3$ | (26) |
| —$(CH_2CH_2O)_3CH_3$ | (27) |
| —$CH_2CH_2O—COCH_2CH_2O—CH_3$ | (28) |
| —$CH_2CH_2O—COCH_2CH_2CH_2O—CH_3$ | (29) |
| —$CH_2CH_2O—COCH_2CH_2CH_2CH_2O—CH_3$ | (30) |
| —$CH_2CH_2O—COCH_2CH_2CH_2CH_2CH_2O—CH_3$ | (31) |
| —$CH_2CH_2O—COCH_2CH_2O—COCH_3$ | (32) |
| —$CH_2CH_2O—COCH_2CH_2CH_2O—COCH_3$ | (33) |
| —$CH_2CH_2O—COCH_2CH_2CH_2CH_2O—COCH_3$ | (34) |
| —$CH_2CH_2O—COCH_2CH_2CH_2CH_2CH_2O—COCH_3$ | (35) |
| —$CH_2CH_2O—(COCH_2CH_2O)_2—COCH_3$ | (36) |
| —$CH_2CH_2O—(COCH_2CH_2CH_2O)_2—COCH_3$ | (37) |

For the formation of the high molecular network, use can be made of various methods, such as a method of carrying out heat treatment, a method of irradiating visible light or light of a ultraviolet region, a method of irradiating radiation, such as an electron ray, etc. No particular restrictions are required for the polymerization temperature, the polymerization time, the intensity of light, and the irradiation time, all of which can be properly established according to the concentration of a crosslinking agent, the concentration of a polymerization initiator, etc.

Also, at the formation of the high molecular network, if necessary, a polymerization initiator can be added. Examples of the polymerization initiator by heat include benzoyl peroxide, benzoyldimethoylaniline peroxide, acetylene peroxide, lauroyl peroxide, azobisbutyronitrile, cumene hydroperoxide, tertiary butyl hydroperoxide, dicumyl peroxide, etc. Examples of the photopolymerization initiator include acetophenone-based compounds such as diethoxy acetophenon, 1-hydroxycyclohexylphenylketone-1-(4-dodecylphenyl)-2-hydroxy-2-methylpropan-1-one, etc.; benzoin compound such as benzoin, benzoin methyl ether, benzoin isobutyl ether, etc.; benzophenone-based compounds such as benzophenone, 4-phenylbenzophenone-3,3'-dimethyl-4-methoxybenzophenone, 3,3',4,4'-tetra(t-butylperoxycarbonyl)benzophenone, etc.; and thioxanthone-based compounds such as thioxanthone, 2-chlorothioxanthone, isopropylthioxanthone-2,4-diisopropylthioxanthone, etc.

In the high molecular gel electrolyte of the present invention, it is preferred that the electrolyte solution is formed by dissolving an ionic compound in a nonaqueous organic solvent and is contained in an amount from 30 to 85% by weight in the matrix polymer. When the amount of the electrolyte solution is less than 30% by weight, the ionic electric conductivity is rapidly lowered to $10^{-5}$ S/cm or lower, which is not practical. Also, when the amount of the electrolyte solution is larger than 85% by weight, the ionic electric conductivity is as high as from $10^{-3}$ to $10^{-2}$ S/cm. However, in this case, not only the mechanical strength is lowered but also there is a possibility that the electrolyte solution oozes at a high temperature. Therefore, it is also unsuitable for practical use.

In the present invention, the ionic compound is not particularly restricted, but may be an ionic compound of a metal belonging to group I or II of the periodic table and be represented by a formula $M^+X^-$ (wherein M represents a metal belonging to group I or II of the periodic table and X is optional). In the particularly preferred compounds, $M^+$ is selected from $Li^+$, $Na^+$, and $K^+$ and more practically, the compound can be suitably used which is selected from $LiClO_4$, $LiBF_4$, $LiPF_6$, $LiCF_3SO_3$, $Li(CF_3SO_2)_2N$, $Li(C_2F_5SO_2)_2N$, $Li(CF_3SO_2)_3C$, and $Li(C_2F_5SO_2)_3C$.

In the present invention, the nonaqueous organic solvent is not particularly restricted but is usually at least one of carbonate-based solvents (propylene carbonate, ethylene carbonate, butylene, carbonate, etc.), amide-based solvents (N-methylformamide, N-ethylformamide, N,N-dimethylformamide, N-methylacetamide, N-ethylacetaide, N-methylpyrrolidone, etc.), lactone-based solvents (γ-butyrolactone, γ-valerolactone, δ-valerolactone, etc.), ether-based solvents, nitrile solvents, etc., are used. In these solvents, ethylene carbonate, propylene carbonate, dimethyl carbonate, diethyl carbonate, methyl ethyl carbonate, or γ-butyrolactone is particularly preferred. To use the solvent effectively, a mixed solvent thereof with other low-viscous solvent may be used.

The secondary battery of the present invention is constituted by a positive electrode, an electrolyte, and a negative electrode. In this battery, the electrolyte may be formed by the above-described high molecular gel electrolyte of the present invention. In the secondary battery of the present invention of such a construction, an ionic conductive high molecule is used as the electrolyte. The ionic conductive high molecule is a solid state and has a high electric conductivity. Therefore, the secondary battery serves as an energy source of a small size, a large capacity, and a high safety.

In the present invention, the positive electrode active substance is not particularly restricted, but use may be made of metal oxides, such as $LiMnO_2$, $LiMn_2O_4$, $LiCoO_2$, $LiNiO_2$, etc.; electric conductive high molecules, such as polypyrrole derivatives, polyaniline derivatives, polythiophene derivatives, poly-paraphenylene derivatives, etc.; and disulfide compounds shown by the formula $(R(S)_m)_n$ (where R represents an aliphatic group or an aromatic group; S is a sulfur; m represents a positive integer of at least 1 and n represents a positive integer of at least 2), etc. For example, dithioglycol, 2,5-dimercapto-1,3,4-thiadiazole, S-triazine-2,4,6-trithiol, 7-methyl-2,6,8-trimercaptopurin, etc. Particularly Preferably, use can be made of the metal oxides, such as $LiMnO_2$, $LiMn_2O_4$, $LiCoO_2$, $LiNiO_2$, etc.

Also, the negative electrode active substance is not also particularly restricted. For the substance, use can be made of materials which can occlude a lithium ion, a lithium metal, alloys of a lithium metal and other metals, which are conventionally known. Examples of the material capable of occluding a lithium ion may include crystalline carbon, such as natural graphite and graphitized carbon obtained by heat-treating a carbon or petroleum pitch at high temperature, a petroleum pitch coke, a coal pitch coke, noncrystalline carbon obtained by heat-treating an acenaphthylene pitch coke, etc.

Accordingly, the particularly suitable example of the secondary battery of the present invention may be called a lithium secondary battery constituted by a positive electrode, an electrolyte, and a negative electrode. In this event, the positive electrode active substance is made up of $LiMnO_2$, $LiMn_2O_4$, $LiCoO_2$, or $LiNiO_2$ while a negative electrode active substance is made up of a material capable of occluding a lithium ion or a lithium metal.

The positive electrode layer of the secondary battery of the present invention can be formed from a mixture obtained by mixing the above-described positive electrode active substance to a proper binder. To ensure the electron conductivity of the positive electrode active substance layer, the mixture may be added with an electric conductivity aid as proper carbonaceous fine particles such as acetylene carbon black, etc. Also, the mixture may be added with an electric conductive polymer, such as a polyaniline derivative, a polypyrrole derivative, a polythiophene derivative, etc. Furthermore, to ensure the ionic conductivity of the positive electrode active layer, use may be made of a conventional ionic conductive high molecular gel electrolyte, preferably the ionic conductive high molecular gel substrate of a solid state of the present invention described above to form a composite. The positive electrode of the secondary battery of the present invention can be obtained, for example, by dissolving the positive active substance and the electrolyte solution having dissolved therein the above-described polyvinylidene fluoride compound and ionic compound with a crosslinking agent added thereto, and the electric conductive aid in a proper solvent to be sufficiently dispersed in a solution, coating the solution on a positive electrode collector, evaporating off the solvent from the solution, and irradiating the coated layer with an electron ray to form a crosslinked structure.

As the positive electrode collector, use can be made of a conventionally known thin film, network material, or the other sheet forms of stainless steel, copper, nickel, aluminum, etc. It is possible to form the negative electrode active substance layer and the negative electrode of the secondary electrode of the present invention by the use of the same methods as the positive electrode active substance layer and the positive electrode described above.

The secondary battery of the present invention can be prepared by an ordinary method, for example, by previously forming an electrolyte thin film of solid state, and thereafter disposing the film between the positive electrode and the negative electrode. Alternatively, after coating the solid electrolyte of the present invention on the positive electrode active substance layer or the negative electrode active substance layer at a predetermined thickness, the secondary battery can be constituted by interposing the coated layer between the positive electrode and the negative electrode. The shape of the secondary battery of the present invention may be optional. That is, the secondary battery can take an optional desired shape, such as a cylindrical shape, a coin-type shape, a gum-type shape, a flat-type shape, etc.

Then, the present invention is specifically described by using the following examples but the present invention is not limited to these examples. Examples 1, 3, and 5 exemplify the high molecular gel electrolytes of the present invention while Comparative Example 1 is compared to this. Examples 2, 4, and 6 illustrate the lithium secondary batteries each using the high molecular gel electrolyte of the present invention while Comparative Example 2 is compared to them.

The thin film was prepared which was made of the high molecular gel electrolyte. As a measurement, the ionic electric conductivity was measured. Both of the preparation and the measurement were carried out in a grove box of an argon gas atmosphere. The ionic electric conductivity was measured in the following manner. First, after the electrolyte was formed to a thin film of a solid state with a definite thickness, the thin film was cut into a definite size. The electrolyte thin film was sandwiched by two platinum blocking electrodes, each of which has the previously cleaned surface. Lead wires were derived from the platinum electrodes and were connected to an electrochemical analyzer (CH Instruments, Model 660). The measurement was carried out at a room temperature. The measuring frequency range was from 10 Hz to 100 kHz and the applied voltage was $5 \times 10^{-2}$ V.

In the charging and discharging test, first, the battery was charged at an electric current of 0.2 C (coulomb) from the charging direction until the voltage of the battery became 4.2 V. After a pause is taken for 30 minutes, the battery was discharged at an electric current of 1.0 C until the voltage of the battery became 3.0 V. Thereafter, charging and discharging were mutually repeated to evaluate the battery characteristics. For the measurement of the repeated charging and discharging characteristics, use was made of the above-described electrochemical analyzer (CH Instruments, Model 660).

EXAMPLE 1

A sample material was prepared in a sample jar by putting 2.2 g of a vinylidene fluoride copolymer of vinylidene fluoride and hexafluoropropylene of a composition ratio of about 85:15 (Elf Japan, Kynar 2751, molecular weight about 400,000), 0.45 g of trimethylolpropane trimethacrylate, 0.35 g of the compound (ii) having the substituent of the above-described formula (6) and containing a carbonyl group, 0.03 g of azobisisobutyronitrile as a crosslinking agent, and 4.5 g of a propylene carbonate/ethylene carbonate mixed solution (at a ratio of 1:1 by weight) containing 1 M of $LiPF_6$. Then the sample material is mixed with 15 g of tetrahydrofuran to form a mixture. By gently stirring the mixture for about 30 minutes, a homogeneous and bubble-free solution was prepared. The solution was cast on stainless steel plate having previously cleaned surface and subjected to evaporating off tetrahydrofuran over a period of about 30 minutes to form a cast films. Thereafter, the cast film was heated to 80° C. for about 10 minutes to carry out a crosslinking reaction. Thus, a high molecular gel electrolyte thin film was obtained which was homogeneous, self-supporting, and tough, and had a thickness of 35 μm. The high molecular gel electrolyte thin film was cut into a definite form and was used for the measurement of the ionic electric conductivity and for the preparation of a secondary battery.

As a measured value of the ionic electric conductivity, 1.6 mS/cm was obtained.

COMPARATIVE EXAMPLE 1

A sample material was prepared in a sample jar by putting 2.7 g of the vinylidene fluoride copolymer as used in Example 1, 0.3 g of trimethylolpropane trimethacrylate, and 4.5 g of a propylene carbonate/ethylene carbonate mixed solution (1:1 by weight ratio). Then, the material was mixed with 15 g of tetrahydrofuran to form a mixture. By gently stirring the mixture for about 30 minutes, a homogeneous bubble-free solution was prepared. The solution was cast on a stainless steel having the previously cleaned surface and subjected to evaporating off tetrahydrofuran over a period of about 30 minutes to form a cast film. To form a crosslinked structure, the case film was irradiated by an electron ray of 10 Mrad in a nitrogen gas atmosphere at room temperature. For the irradiation of the electron ray, use was made of an apparatus of TYPE-CB250/15/180LEB, manufactured by IWASAKI ELECTRIC CO., LTD. The accelerating voltage was 160 keV. The high molecular gel electrolyte thin film thus obtained was immersed in a propylene carbonate/ethylene carbonate mixed solution (at a ratio of 1:1 by weight) containing 1 M of $LiPF_6$ for about 10 minutes to carry out the replacement of the electrolyte solution. The electrolyte solution was sufficiently wiped away from the surface to obtain a homogeneous, self-supporting, and tough high molecular gel electrolyte thin film. The high molecular gel electrolyte thin film was cut into a definite shape and was used for measurement of the ionic electric conductivity. As a measured value of the ionic electric conductivity, 1.1 mS/cm was obtained.

From the comparison results of Example 1 and Comparative Example 1, it can be seen that the high molecular gel electrolyte of the present invention has a higher electric conductivity and that the production method thereof is easy.

EXAMPLE 2

FIG. 1 is a schematic cross sectional view of the lithium secondary battery of Example 2 obtained by applying the high molecular gel electrolyte of the present invention to a thin-type polymer lithium ion secondary battery. In this example, a Li composite metal oxide, a high molecular gel electrolyte and a lithium ion-occluding carbonaceous material as the positive electrode active substance, the electrolyte, and the negative electrode.

Specifically, the lithium secondary battery 11 of the present invention is structured by a positive electrode active substance layer 15 attached to one surface of a positive electrode collector 13 and a negative electrode active substance layer 19 attached to one surface of a negative electrode collector 17. All of the layers 15, 13, 19, and 17 are stacked or laminated via a polymer solid electrolyte layer 21.

The illustrated polymer lithium secondary battery 11 was manufactured in the following manner.

The vinylidene fluoride copolymer used in Example 1, $LiPF_6$, propylene carbonate, and tetrahydrofuran are compounded at a ratio of 10:1.5:10:100 by weight to obtain a uniform liquid. Also, after adding a kneaded product of $LiMn_2O_4$ and acetylene black (at a ratio of 92:8 by weight) to the mixed solution, the resultant mixture was stirred to provide a mixture. In addition, in this case, the mixing ratio was adjusted about a mixture of the kneaded mixture of $LiMn_2O_4$ and acetylene black to the solution containing the vinylidene fluoride copolymer so that the weight ratio of the kneaded mixture to the vinylidene fluoride copolymer became 95:5. Then, tetrahydrofuran alone was evaporated from the mixture, the mixture was formed into a sheet form by a roll press. The sheet was cut into a proper size to prepare the positive electrode active substance layer 15 having a capacity of about 25 mAh and a thickness of 120 $\mu$m. Thereafter, the positive electrode active substance layer was stuck to the center portion of one surface of the positive electrode collector 13 which was made up of an aluminum foil having a thickness of 20 $\mu$m. In addition, because the positive electrode active substance layer 15 prepared as described above had a pressure-sensitive adhesive property, it could be stuck to the positive electrode collector without using an adhesive.

On the other hand, a mixture was prepared by mixing the electrolyte solution containing the vinylidene fluoride copolymer used in the case of forming the above-described positive electrode active substance layer 15 and a kneaded product of a powdery petroleum coke and acetylene black at a ratio of 20:1 by weight and by thereafter stirring them. In addition, in this case, the mixing ratio was adjusted about a mixture of the kneaded product of the powdery petroleum coke and acetylene black to the vinylidene fluoride copolymer so that the weight ratio of the kneaded product and the vinylidene fluoride copolymer became 95:5. Then, after the tetrahydrofuran alone was evaporated from the mixture, the mixture was formed into a sheet form by a roll press. The sheet was cut into the same size as the positive electrode active substance layer 15 to prepare a negative electrode active substance layer 19. The negative electrode active substance layer 19 had a capacity of about 26 mAh and a thickness of 90 $\mu$m. Thereafter, like the positive electrode, the negative electrode active substance layer 19 was stuck to a negative electrode collector 17 made up of a copper foil having a thickness of 20 $\mu$m.

Furthermore, after placing a hot melt of a heat pressure-sensitive type on the peripheral portion of the positive electrode collector 13, the negative electrode connector 17 was prepared which had formed thereon the negative electrode active substance layer 19. The negative electrode connector was placed on the positive electrode collector such that the high molecular gel electrolyte thin film of Example 1 was inserted between both the active substance layer of the collectors. Then, by heating, the hot melt 23 was completely connected to the peripheral portions of the connectors to accomplish a polymer lithium ion secondary battery.

COMPARATIVE EXAMPLE 2

Figure 2:
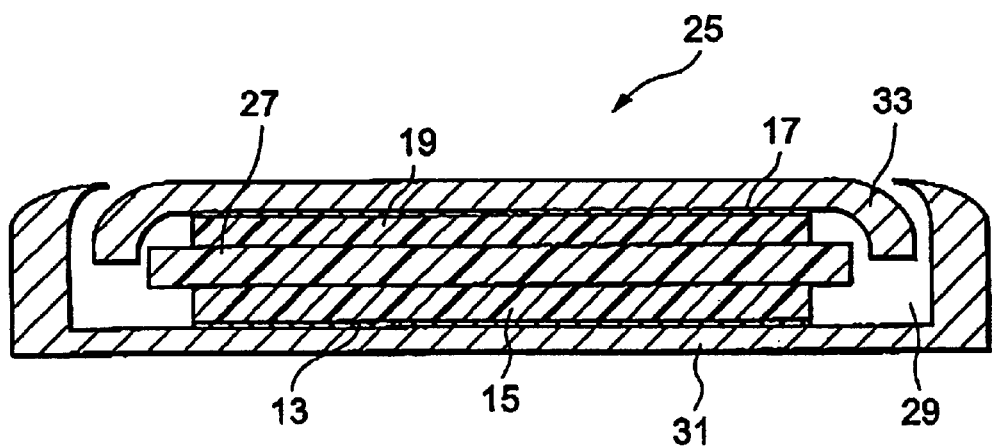
FIG. 2 is a cross sectional view of a coin-type lithium ion secondary battery of Comparative Example 2.

FIG. 2 is a schematic cross sectional view of a coin-type lithium ion secondary battery 25 using an ordinary electrolyte solution and separator. As a positive electrode active substance layer 15 and a negative electrode active substance layer 19, the same layers as those in Example 2 were used.

The coin-type lithium ion secondary battery 25 was produced as follows.

First, the positive electrode active substance layer was placed on a positive electrode collector 13 made up of an aluminum foil having a thickness of 20 $\mu$m stuck to the bottom of a positive electrode case. Then, a ring-shaped gasket was placed on the peripheral portion of the positive electrode case. The ring-shaped gasket had been made up of polypropylene. Then, a negative electrode active substance film was cut into a circular form having the same diameter as the positive electrode and was placed on a negative electrode collector 17 which was made up of a copper foil stuck to the inside wall of a negative electrode case and mounted thereto by press-sticking.

Then, 0.05 ml of an electrolyte solution was prepared such that the composition ratio of propylene carbonate, dimethyl carbonate, and $LiPF_6$ became 10:10:3 and was dripped onto the positive electrode active substance layer 15. Thereafter, a separator composed of a non-woven fabric of polypropylene covered the positive electrode active substance layer 15 so that the separator completely covered the surface of the active substance layer 15. Furthermore, 0.05 ml of the electrolyte solution was dripped onto the separator and thereafter a negative electrode case 31 was placed on an electrolyte layer 27 such that the electrolyte layer 27 including the separator was inserted between them. Also, the positive electrode case 29 was placed on the negative electrode case 31 by the ring-shaped gasket 29. The peripheral portions of both cases were caulked to accomplish a coin-type lithium ion secondary battery.

Figure 3:
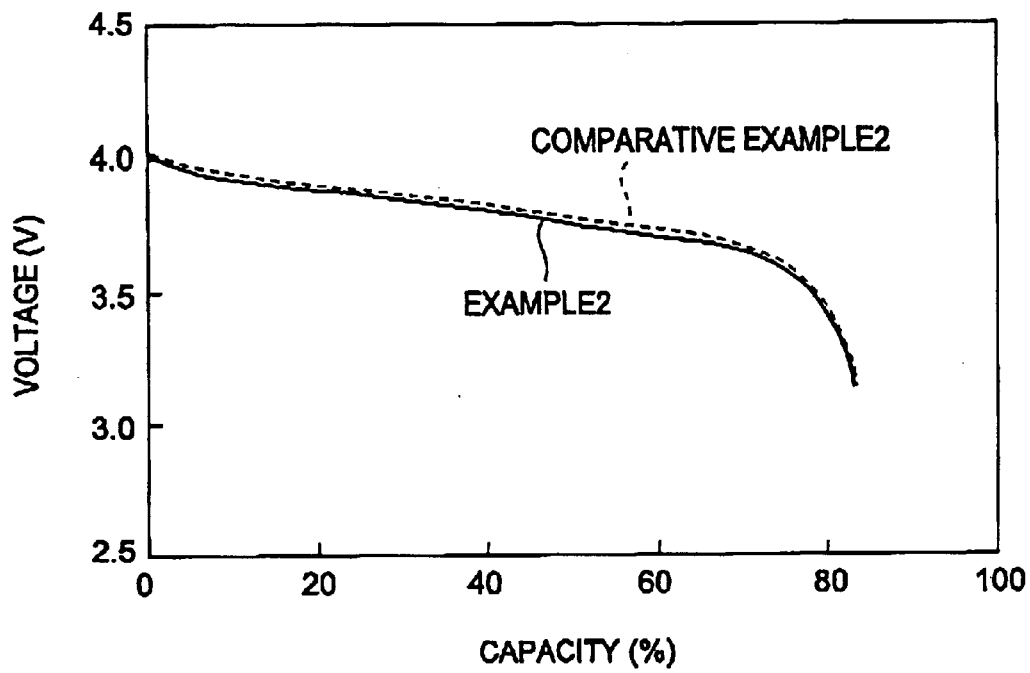
FIG. 3 is a graph showing discharging characteristics of the lithium secondary batteries of Example 2 according to the present invention together with Comparative Example 2.
Figure 4:
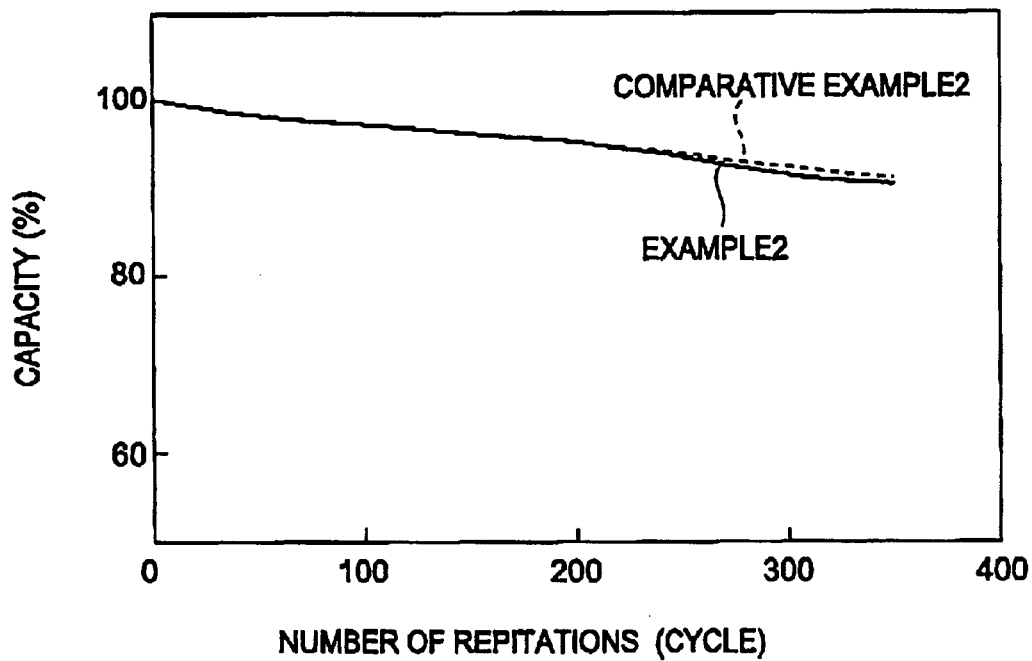
FIG. 4 is a graph showing charging-discharging repeating characteristics of the lithium secondary batteries of Example 2 according to the present invention together with Comparative Example 2.

The discharging characteristics of the two secondary batteries of Example 2 and Comparative Example 2 are shown in FIG. 3 and the charging and discharging characteristics of them are shown is FIG. 4. In FIGS. 3 and 4, it can be seen that because in the secondary battery of the present invention, the high molecular gel electrolyte used has a high ionic electric conductivity, in the high-rate discharging (~1C), the same battery performance as the secondary battery using the conventional electrolyte solution is obtained.

The high molecular gel electrolyte of the present invention of above-described Examples 1 and 2 has mainly the following two effects (1) and (2).

(1) Because the vinylidene fluoride polymer is surrounded by a uniform high molecular network, the electrolyte is excellent in the mechanical characteristics.

(2) Because the high molecular network contains a carbonyl group, the electric conductivity of the high molecular gel electrolyte using a carbonate-based organic solvent is improved.

Therefore, the high molecular gel electrolyte of the present invention can easily carry out the design thereof by the option combination of various components of the high molecular gel electrolyte according to the required performance of the ionic electric conductivity and the mechanical strength.

Accordingly, the high molecular gel electrolyte of the present invention can realize the excellent mechanical strength of a practical level and the high ionic conductivity of 1.0 MS/cm or higher of a practical level and also can ensure the electrolyte solution retentive property at high temperature, and thus, the real application as the electrolyte of a secondary battery can be largely expected. Also, because the secondary battery using the high molecular gel electrolyte of the present invention has a high ionic electric conductivity of the electrolyte, a high output of a similar level to that of a secondary battery using a conventional electrolyte solution can be realized. In addition, because in the secondary battery of the present invention, there is no possibility of causing a liquid leakage to occur. This means that the safety is high and the battery can be extremely become thin in thickness.

As described above, since the high molecular gel electrolyte of the present invention has a high ionic electric conductivity and is excellent in the mechanical strength, the battery can be easily handled, and also is excellent in workability. Thus, the electrolyte of the present invention can largely contribute to the realization of a small-sized and large capacity solid-type secondary battery and, in particular, the lithium or lithium ion solid-type secondary battery can accomplish a high output and a high safety.

EXAMPLE 3

A sample material was prepared in a sample jar by putting 2.3 g of a vinylidene fluoride copolymer of vinylidene fluoride and hexafluoropropylene of a composition ratio of about 85:15 (Elf Japan, Kynar 2751, molecular weight about 400,000) 0.4 g of trimethylolpropane trimethacryate, 0.3 g of vinylpyrrolidone, 0.03 g of azobisisobutyronitrile as a crosslinking agent, and 4.5 g of a propylene carbonate/ethylene carbonate mixed solution (at a ratio of 1:1 by weight) containing 1 M of $LiPF_6$. Then the sample material was mixed with 15 g of tetrahydrofuran to form a mixture. The mixture was gently stirred for about 30 minutes to prepare a homogeneous bubble-free solution. The solution was cast on a stainless steel plate having the previously cleaned surface and subjected to evaporating off tetrahydrofuran over a period of about 30 minutes to form a cast film. The cast film was heated to 80° C. for about 10 minutes to carry out crosslinking. Thus, a high molecular gel electrolyte thin film was obtained which was homogeneous, self-supporting, and tough and had a thickness of 31 $\mu$m. The high molecular gel electrolyte thin film was cut into a definite form and was used for the measurement of the ionic electric conductivity and for preparing a secondary battery. As a measured value of the ionic electric conductivity, 1.5 mS/cm was obtained.

As the result of comparing with above-described Comparative Example 1, it can be seen that the high molecular gel electrolyte of Example 3 has a higher electric conductivity and the excellent electrolyte retentive property, and further the production method is easy.

EXAMPLE 4

A lithium secondary battery of Example 4 has the high molecular gel electrolyte of the present invention and the same construction as that shown in FIG. 1. The lithium secondary battery has a positive electrode active substance layer formed on one surface of a positive electrode collector and a negative electrode active substance layer formed on one surface of a negative electrode collector. In addition, and the positive and the negative electrode active layers are laminated via a polymer solid electrolyte layer. The polymer lithium ion secondary battery was produced as follows.

By compounding the vinylidene fluoride copolymer as used in Example 3, $LiPF_6$, propylene carbonate, and tetrahydrofuran at a ratio of 10:1.5:10:100 by weight, a homogeneous solution was prepared. Also, after adding a kneaded product of $LiMn_2O_4$ and acetylene black (92:8 by weight ratio) to the mixed solution, the resultant mixture was stirred to provide a mixture. In addition, in this case, the mixing ratio was adjusted about a mixture of the kneaded mixture of $LiMn_2O_4$ and acetylene black to obtain the solution containing the vinylidene fluoride copolymer so that the weight ratio of the kneaded mixture to the vinylidene fluoride copolymer became 95:5. Then, after evaporating off tetrahydrofuran only from the mixture, the mixture was formed into a sheet form by a roll press. The resultant sheet was cut into a proper size to prepare the positive electrode active substance layer 15 having a capacity of about 25 mAh and a thickness of 120 $\mu$m. Thereafter, the positive electrode active substance layer was stuck to the center portion of one surface of the positive electrode collector 13 which was made up of an aluminum foil having a thickness of 20 $\mu$m. In addition, because the positive electrode active substance layer 15 prepared as described above had a pressure-sensitive adhesive property, it could be stuck to the positive electrode collector 13 without using an adhesive.

On the other hand, the electrolyte solution is also prepared which contains the vinylidene fluoride copolymer and is used in the case of forming the above-described positive electrode active substance layer 15. The electrolyte solution is mixed with a kneaded product of a powdery petroleum coke and acetylene black at a ratio of 20:1 by weight and stirred to prepare a mixture. In addition, in this case, the mixing ratio is ajusted about the mixture of the kneaded product of the powdery petroleum coke and acetylene black and the vinylidene fluoride copolymer so that the weight ratio of the kneaded product and the vinylidene fluoride copolymer became 95:5. Then, after evaporating off tetrahydrofuran only from the mixture, the mixture was formed into a sheet form by a roll press and cut into the same size as the positive electrode active substance layer 15 to prepare a negative electrode active substance layer 19 having a capacity of about 26 mAh and a thickness of 90 $\mu$m. Thereafter, like the positive electrode, the negative electrode active substance layer 19 was stuck to a negative electrode collector 17 made up of a copper foil having a thickness of 20 $\mu$m.

Furthermore, a hot melt 23 of a heat pressure-sensitive type was placed on the peripheral portion of the positive electrode collector 13 and subsequently the negative electrode connector 17 was prepared which had formed thereon the negative electrode active substance layer 19. The negative electrode connector was placed on the positive electrode collector such that the high molecular gel electrolyte thin film of Example 3 was interposed between both the active substance layers of the collectors. Then, by heating, the hot melt 23 was completely connected to the peripheral portions of the connectors to accomplish a polymer lithium ion secondary battery 11.

Figure 5:
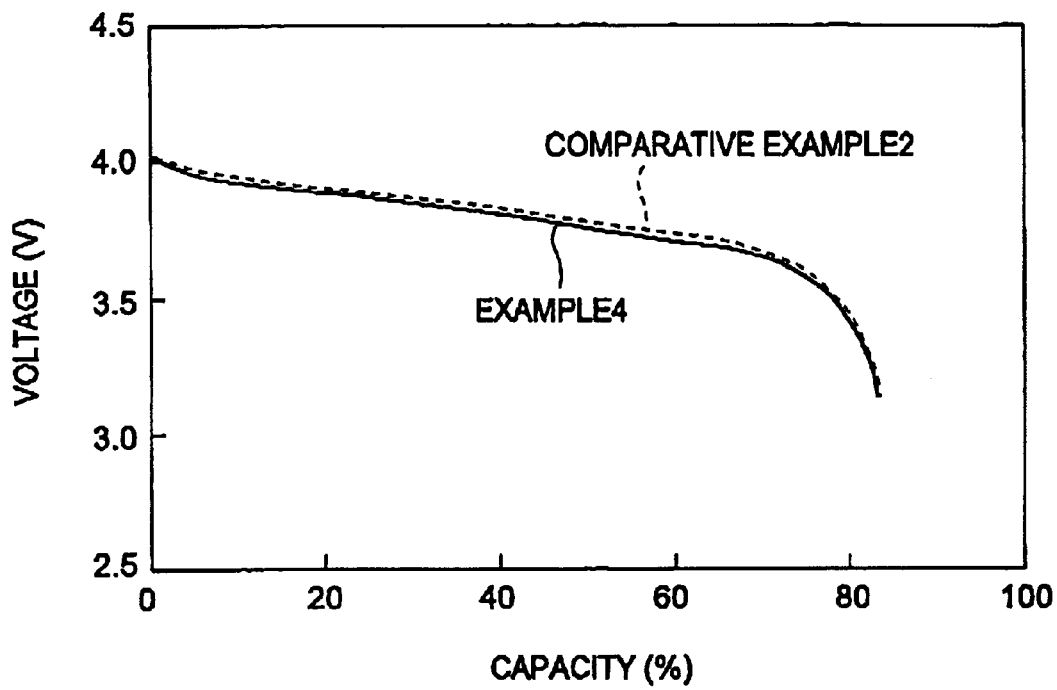
FIG. 5 is a graph showing the discharging characteristics of lithium secondary batteries of Example 4 according to the present invention together with Comparative Example 4.
Figure 6:
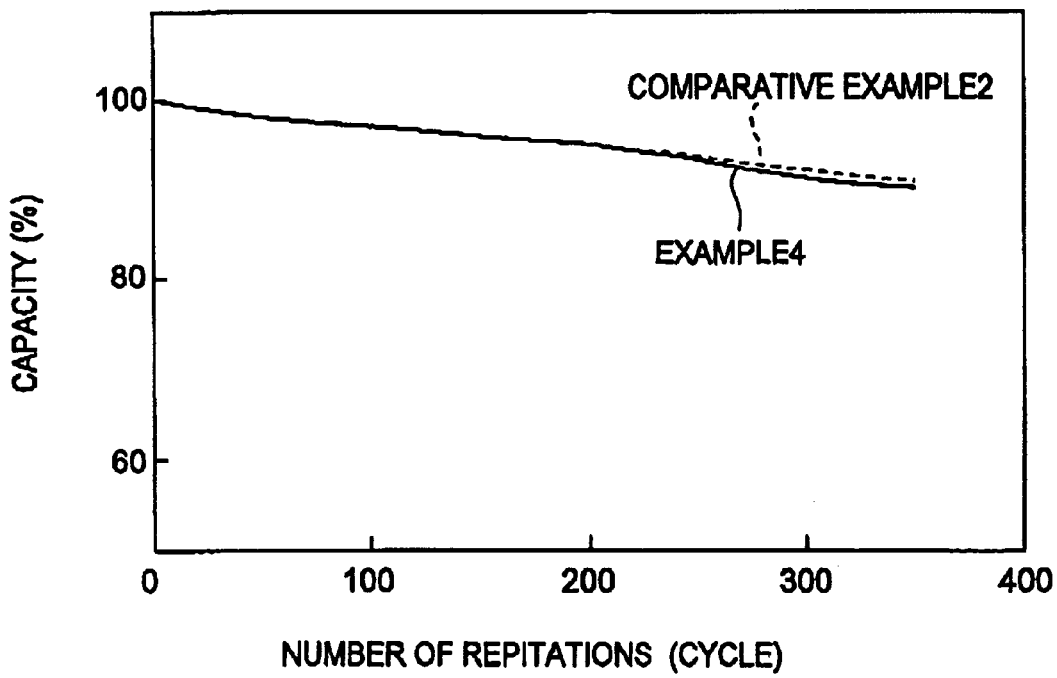
FIG. 6 is a graph showing the charging-discharging repeating characteristics of the lithium secondary batteries of Example 4 according to the present invention together with Comparative Example 4.

The discharging characteristics of the secondary batteries of Example 4 and Comparative Example 2 are shown in FIG. 5 and the charging and discharging characteristics of them are shown in FIG. 6.

Referring to FIGS. 5 and 6, it can be seen that because in the secondary battery of the present invention, the high molecular gel electrolyte used has a high ionic electric conductivity, even in the high-rate discharge (~1 C) and accomplishes the same battery performance as the secondary battery using the conventional electrolyte solution.

The high molecular gel electrolyte of the present invention of the above-described Examples 3 and 4 has mainly the following two effects (3) and (4).

(3) Since the vinylidene fluoride polymer is surrounded by a uniform high molecular network, the electrolyte is excellent in the mechanical characteristics.

(4) Since the high molecular network contains a carbonyl group, the electric conductivity of the high molecular gel electrolyte using a carbonate-based organic solvent is improved.

This shows that the high molecular gel electrolyte of the present invention can be easily designed by the optimum combination of various components of the high molecular gel electrolyte according to the required performance of the ionic electric conductivity and the mechanical strength.

Accordingly, the high molecular gel electrolyte of the present invention can achieve the excellent mechanical strength of a practical level and the high ionic conductivity of 1.0 MS/cm or higher of a practical level and also can ensure the electrolyte solution retentive property at high temperature. Thus, the real application as the electrolyte of a secondary battery can be largely expected. Also, because the electrolyte has a high ionic electric conductivity in the secondary battery which uses the high molecular gel electrolyte of the present invention, a high output can be achieved which is similar in level to a secondary battery using a conventional electrolyte solution. In addition, the secondary battery has no possibility of causing a liquid leakage to occur in the present invention. Therefore, the safety is high and the battery can become extremely thin.

As described above, the high molecular gel electrolyte in Examples 3 and 4 of the present invention has a high ionic electric conductivity and is excellent in the mechanical strength. The electrolyte can be easily handled and also is excellent in workability. Accordingly, the electrolyte of the present invention can largely contribute to the realization of a small-sized and large capacity solid-type secondary battery and particularly lithium or lithium ion solid-type secondary battery can accomplish a high output and a high safety.

EXAMPLE 5

A sample material was prepared in a sample jar by putting 2.3 g of a vinylidene fluoride copolymer of vinylidene fluoride and hexafluoropropylene of a composition ratio of about 85:15 (Elf Japan, Kynar 2751, molecular weight about 400,000), 0.25 g of trimethylolpropane trimethacrylate, 0.25 g of the compound (ii) (mentioned before) having the substituent of the above-described formula (7) and containing an oxyalkylene group, 0.03 g of azobisisobutyronitrile as a crosslinking agent, and 4.5 g of a propylene carbonate/ethylene carbonate mixed solution (at a ratio of 1:1 by weight) containing 1 M of $LiPF_6$. Then, 15 g of tetrahydrofuran was added thereto to form a mixture. By gently stirring the mixture for about 30 minutes, a homogeneous and bubble-free solution was prepared. The solution was cast on stainless steel plate having previously cleaned surface and subjected to evaporating off tetrahydrofuran over a period of about 30 minutes. The cast film was heated to 80° C. for about 10 minutes to carry out a crosslinking reaction. Thus, a high molecular gel electrolyte thin film was obtained which was homogeneous, self-supporting, and tough and had a thickness of 31 μm. The high molecular gel electrolyte thin film was cut into a definite form and was used for the measurement of the ionic electric conductivity and for the preparation of a secondary battery. As a measured value of the ionic electric conductivity, 1.3 mS/cm was measured.

Accordingly, it was found that the high molecular gel electrolyte of the present invention has a higher electric conductivity as well as the excellent electrolyte solution retentive property, and further the production method thereof is easy.

EXAMPLE 6

A lithium secondary battery of Example 6 which uses the high molecular gel electrolyte of the present invention is similar in structure to that shown in FIG. 1. The lithium secondary battery 11 of this example has a positive electrode active substance layer 15 formed on one surface of a positive electrode collector 13 and a negative electrode active substance layer 19 formed on one surface of a negative electrode collector 17. Furthermore, the positive and the negative active substance layers are stacked via a polymer solid electrolyte layer 21. The polymer lithium ion secondary battery was produced as follows.

By compounding the vinylidene fluoride copolymer used in Example 5, $LiPF_6$, propylene carbonate, and tetrahydrofuran at a ratio of 10:1.5:10:100 by weight, a homogeneous solution was prepared. Also, after adding a kneaded product of $LiMn_2O_4$ and acetylene black (in a ratio of 92:8 by weight) to the mixed solution, the resultant mixture was stirred to provide a mixture. In addition, in this case, the mixing ratio was adjusted about the mixture of the kneaded mixture of $LiMn_2O_4$ and acetylene black to obtain the solution containing the vinylidene fluoride copolymer so that the weight ratio of the kneaded mixture to the vinylidene fluoride copolymer became 95:5. Then, after tetrahydrofuran alone was evaporated off only from the mixture, the mixture was formed into a sheet form by a roll press. The sheet was cut into a proper size to prepare the positive electrode active substance layer 15 having a capacity of about 25 mAh and a thickness of 120 μm. Thereafter, the positive electrode active substance layer was stuck to the center portion of one surface of the positive electrode collector 13 which was made up of an aluminum foil having a thickness of 20 μm. In addition, because the positive electrode active substance layer 15 prepared as described above had a pressure-sensitive adhesive property, it could be stuck to the positive electrode collector 13 without using an adhesive.

On the other hand, the electrolyte solution was also prepared which contained the vinylidene fluoride copolymer and which was used in the case of forming the above-described positive electrode active substance layer 15. The electrolyte solution was mixed with a kneaded product of a powdery petroleum coke and acetylene black at a ratio of 20:1 by weight and stirred to prepare a mixture. In addition, in this case, the mixing ratio was adjusted about a mixture of the kneaded product of the powdery petroleum coke and acetylene black to the vinylidene fluoride copolymer so that the weight ratio of the kneaded product and the vinylidene fluoride copolymer became 95:5. Then, after only tetrahydrofuran was evaporated off from the mixture, the mixture was formed into a sheet form by a roll press. The sheet was cut into the same size as the positive electrode active substance layer 15 to prepare a negative electrode active substance layer 19 having a capacity of about 26 mAh and a thickness of 90 μm. Thereafter, in the manner similar to the positive electrode, the negative electrode active substance layer 19 was stuck to a negative electrode collector 17 which was made up of a copper foil having a thickness of 20 μm.

Furthermore, the negative electrode connector 17 was prepared on which the negative electrode active substance layer 19 was formed after a hot melt 23 of a heat pressure-sensitive type was placed on the peripheral portion of the positive electrode collector 13, the negative electrode collector was placed on the positive electrode collector 13 such that the high molecular gel electrolyte thin film of Example 5 was interposed between both the active substance layers of the collectors. Then, by heating, the hot melt 23 was completely connected to the peripheral portions of the connectors 13 and 17 to accomplish a polymer lithium ion secondary battery.

Figure 7:
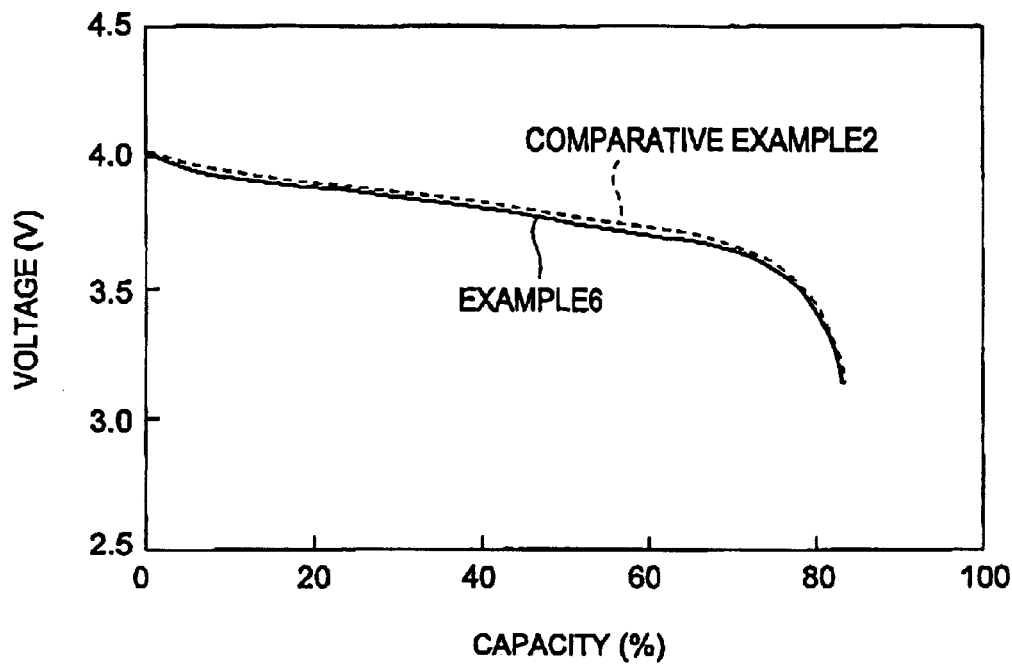
FIG. 7 is a graph showing discharging characteristics of lithium secondary batteries of Example 6 according to the present invention together with Comparative Example 6.
Figure 8:
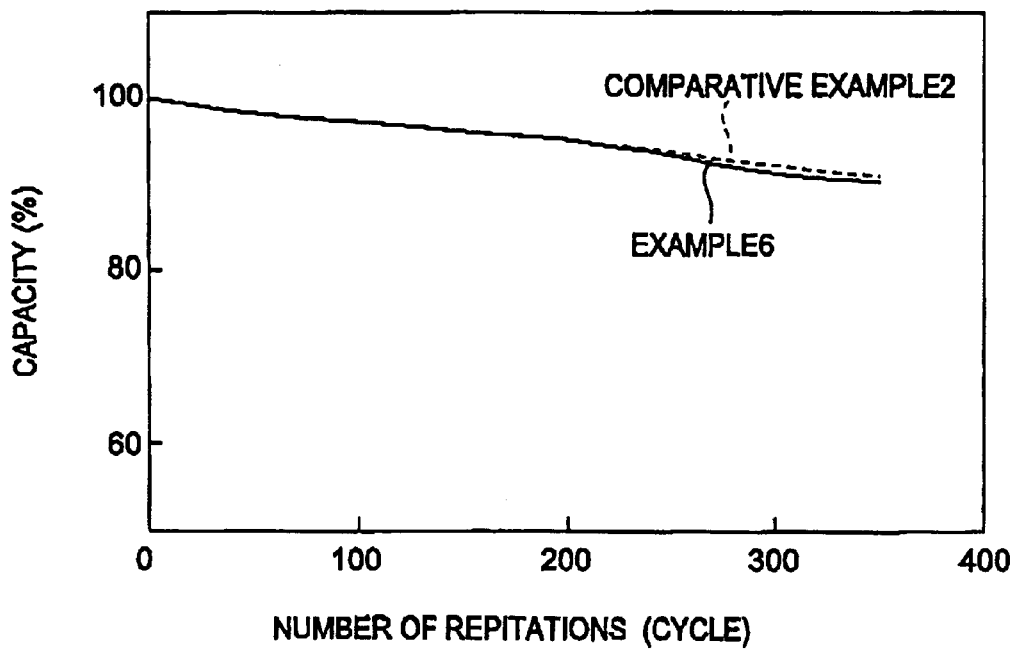
FIG. 8 is a graph showing charging-discharging repeating characteristics of the lithium secondary batteries of Example 6 according to the present invention together with Comparative Example 6.

The discharging characteristics of the secondary batteries of Example 6 and Comparative Example 2 are shown in FIG. 7 and the charging and discharging characteristics of them are shown in FIG. 8.

From the results of FIG. 7 and FIG. 8, it can be seen that because in the secondary battery by Example 6 of the present invention, the high molecular gel electrolyte used has a high ionic electric conductivity, in the high-rate discharging (~1 C) and it is possible to obtain the same battery performance as the secondary battery using the conventional electrolyte solution.

The high molecular gel electrolyte of the present invention of the above-described Examples 5 and 6 has mainly the following two effects (5) and (6).

(5) Inasmuch as the vinylidene fluoride polymer is surrounded by a uniform high molecular network, the electrolyte is excellent in the mechanical characteristics.

(6) Inasmuch as the high molecular network contains a carbonyl group, the electric conductivity of the high molecular electrolyte using a carbonate-based organic solvent is improved.

Therefore, the high molecular gel electrolyte of the present invention can be easily designed by the optimum combination of various components of the high molecular gel electrolyte according to the required performance of the ionic electric conductivity and the mechanical strength.

Accordingly, the high molecular gel electrolyte of the present invention can accomplish the excellent mechanical strength of a practical level and the high ionic conductivity of 1.0 MS/cm or of a practical level and can ensure the electrolyte solution retentive property at high temperature. Thus, the real application as the electrolyte of a secondary battery can be largely expected. Also, because in the secondary battery using the high molecular gel electrolyte of the present invention, the ionic electric conductivity of the electrolyte is high, a high output of an almost same level as that of a secondary battery using a conventional electrolyte solution can be achieved. Also, because the secondary battery of the present invention has no possibility of causing a liquid leakage to occur, the safety is high and the battery can become extremely thin.

As described above, the high molecular gel electrolyte by Examples 5 and 6 of the present invention has a high ionic electric conductivity, excellent mechanical strength, facilitation of handling, and excellent workability, the electrolyte of the present invention is very effective to realize a small-sized and large capacity solid-type secondary battery and, particularly, lithium or lithium ion solid-type secondary battery can have a high output and a high safety.

What is claimed is:

1. A secondary battery comprising a positive electrode, an electrolyte, and a negative electrode, wherein the electrolyte comprises a high molecular gel electrolyte comprising
    a) a matrix polymer comprising
        (i) a compound containing at least two polymerizable functional groups;
        (ii) a compound having a polymerizable functional group and a carbonyl group, an amido group, or an oxyalkylene group; and
        (iii) a vinylidene fluoride polymer and
    b) an electrolyte solution containing an ionic compound dissolved in a nonaqueous organic solvent.

2. The secondary battery of claim 1, wherein the polymerizable functional group contains an unsaturated ethylene group.

3. The secondary battery of claim 2, wherein the polymerizable functional group containing an unsaturated ethylene group is an acryloyl group or a methacryloyl group.

4. The secondary battery of claim 1, wherein the electrolyte solution comprises from 30 to 85% by weight to the matrix polymer of the high molecular gel electrolyte.

5. The secondary battery of claim 1, wherein the ionic compound is formed by an ionic compound of a metal belonging to Group I or II of the Periodic Table.

6. The secondary battery of claim 5, wherein the ionic compound is selected from the group consisting of $LiClO_4$, $LiBF_4$, $LiPF_6$, $LiCF_3SO_3$, $Li(CF_3SO_2)_2N$, $Li(C_2F_5SO_2)_2N$, $Li(CF_3SO_2)_3C$, and $Li(C_2F_5SO_2)_3C$.

7. The secondary battery of claim 1, wherein the nonaqueous organic solvent includes at least one solvent selected from the group consisting of carbonate-based solvents, amido-based solvents, lactone-based solvents, and ether-based solvents.

8. The secondary battery of claim 7, wherein the nonaqueous organic solvent includes at least one solvent selected from the group consisting of ethylene carbonate, propylene carbonate, dimethyl carbonate, diethyl carbonate, methyl ethyl carbonate, and γ-butyrolactone.

9. The secondary battery of claim 1, further comprising positive and negative electrode active substances, wherein said positive electrode active substance are selected from the group consisting of $LiMnO_2$, $LiMn_2O_4$, $LiCoO_2$, or $LiNiO_2$, and said negative electrode active substance are selected from the group consisting of a material capable of occluding a lithium ion or a lithium metal.

10. A high molecular gel electrolyte comprising
    a) a matrix polymer comprising
        (i) a compound containing at least two polymerizable functional groups;
        (ii) a compound having a polymerizable functional group and a carbonyl group, an amido group, or an oxyalkylene group; and
        (iii) a vinylidene fluoride polymer and
    b) an electrolyte solution containing an ionic compound dissolved in a nonaqueous organic solvent.

11. The high molecular gel electrolyte of claim 10, wherein the polymerizable functional group contains an unsaturated ethylene group.

12. The high molecular gel electrolyte of claim 11, wherein the polymerizable functional group containing an unsaturated ethylene group is an acryloyl group or a methacryloyl group.

13. The high molecular gel electrolyte of claim 10, wherein the contained amount of the electrolyte solution comprises from 30 to 85% by weight to the matrix polymer of the high molecular gel electrolyte.

14. The high molecular gel electrolyte of claim 10, wherein the ionic compound is an ionic compound of a metal belonging to Group I or II of the Periodic Table.

15. The high molecular gel electrolyte of claim 11, wherein the ionic compound is selected from the group consisting of $LiClO_4$, $LiBF_4$, $LiPF_6$, $LiCF_3SO_3$, $Li(CF_3SO_2)_2N$, $Li(C_2F_5SO_2)_2N$, $Li(CF_3SO_2)_3C$, and $Li(C_2F_5SO_2)_3C$.

16. The high molecular gel electrolyte of claim 10, wherein the nonaqueous organic solvent includes at least one solvent selected from the group consisting of carbonate-based solvents, amido-based solvent, lactone-based solvents, and ether-based solvents.

17. The high molecular gel electrolyte of claim 16, wherein the nonaqueous organic solvent includes at least one solvent selected from the group consisting of ethylene carbonate, propylene carbonate, dimethyl carbonate, diethyl carbonate, methyl ethyl carbonate, and γ-butyrolactone.

18. The secondary battery according to claim 1, wherein the compound having a polymerizable functional group and a carbonyl group has the structural formula (1)

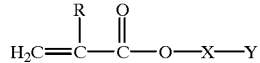
(1)

where R represents a hydrogen atom or a methyl group, X does not exist or represents an alkylene group or an oxyalkylene group, and Y denotes a substituent having at least one carbonate bond.

19. The secondary battery according to claim 1, wherein the compound having a polymerizable functional group and an amido group has the structural formula (2) or (3)

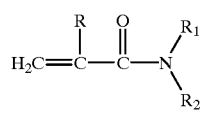
(2)

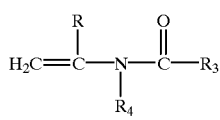
(3)

where R represents a hydrogen atom or a methyl group and $R_1$ and $R_2$ or $R_3$ and $R_4$ each independently represent an aliphatic group or an aliphatic group containing a heteroatom.

20. The secondary battery according to claim 1, wherein the compound having a polymerizable functional group and an oxyalkylene group has the structural formula (4)

(4)

where R represents a hydrogen atom or a methyl group and Z represents a substituent containing an oxyalkylene group.

21. The secondary battery according to claim 10, wherein the compound having a polymerizable functional group and a carbonyl group has the structural formula (1)

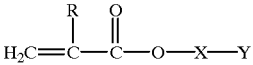
(1)

where R represents a hydrogen atom or a methyl group, X does not exist or represents an alkylene group or an oxyalkylene group, and Y denotes a substituent having at least one carbonate bond.

22. The secondary battery according to claim 10, wherein the compound having a polymerizable functional group and an amido group has the structural formula (2) or (3)

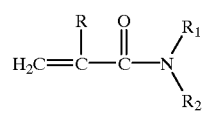
(2)

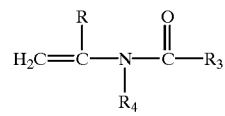
(3)

where R represents a hydrogen atom or a methyl group and $R_1$ and $R_2$ or $R_3$ and $R_4$ each independently represent an aliphatic group or an aliphatic group containing a heteroatom.

23. The secondary battery according to claim 10, wherein the compound having a polymerizable functional group and an oxyalkylene group has the structural formula (4)

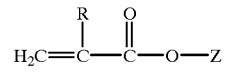
(4)

where R represents a hydrogen atom or a methyl group and Z represents a substituent containing an oxyalkylene group.

* * * * *